Patented Sept. 22, 1931

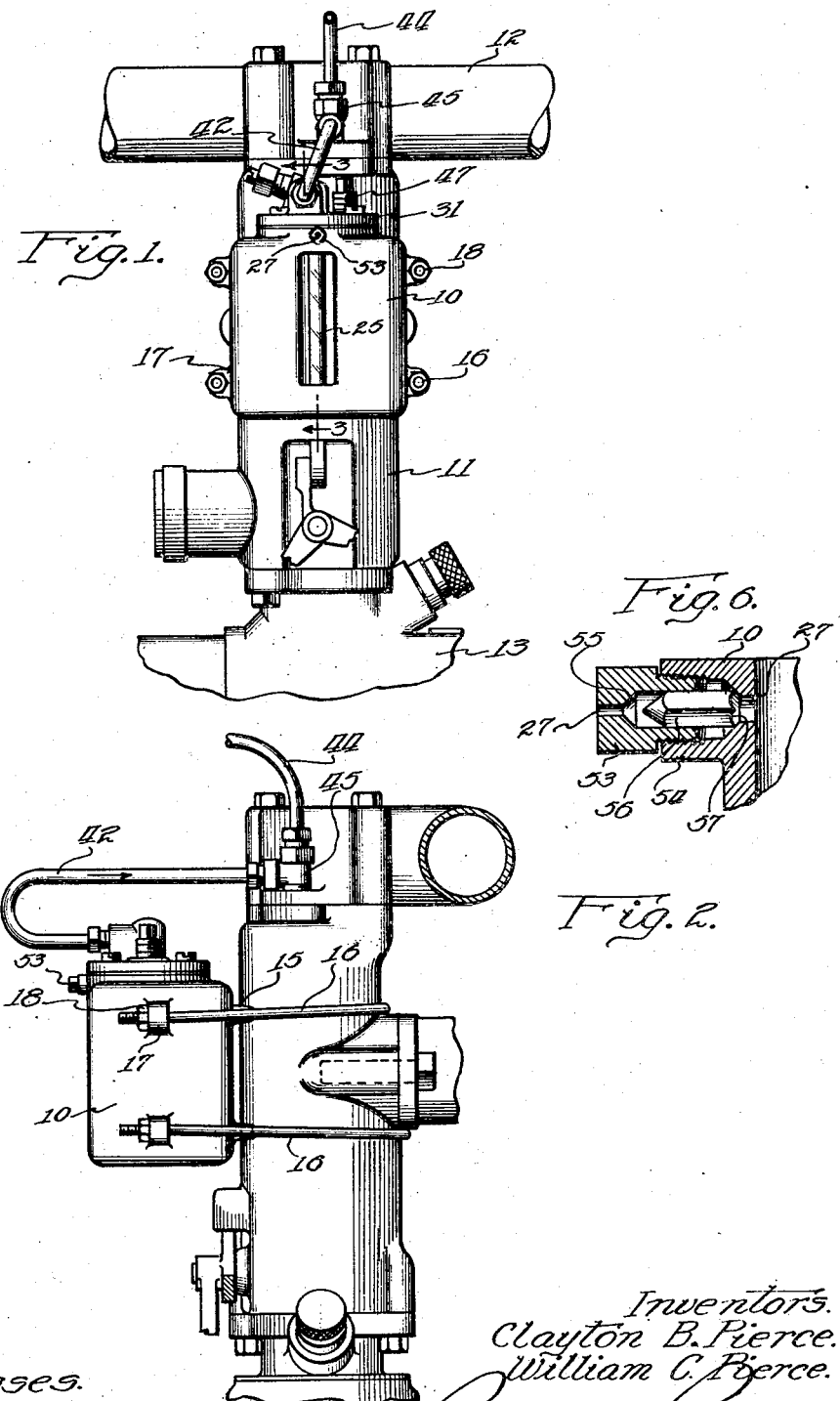

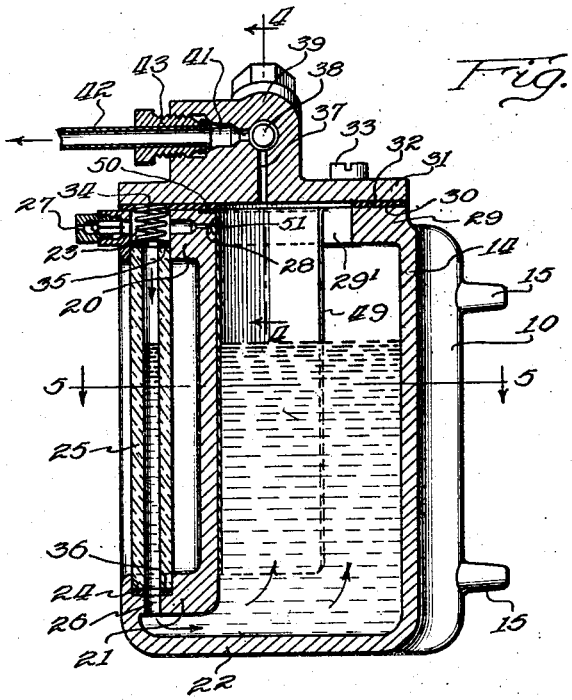
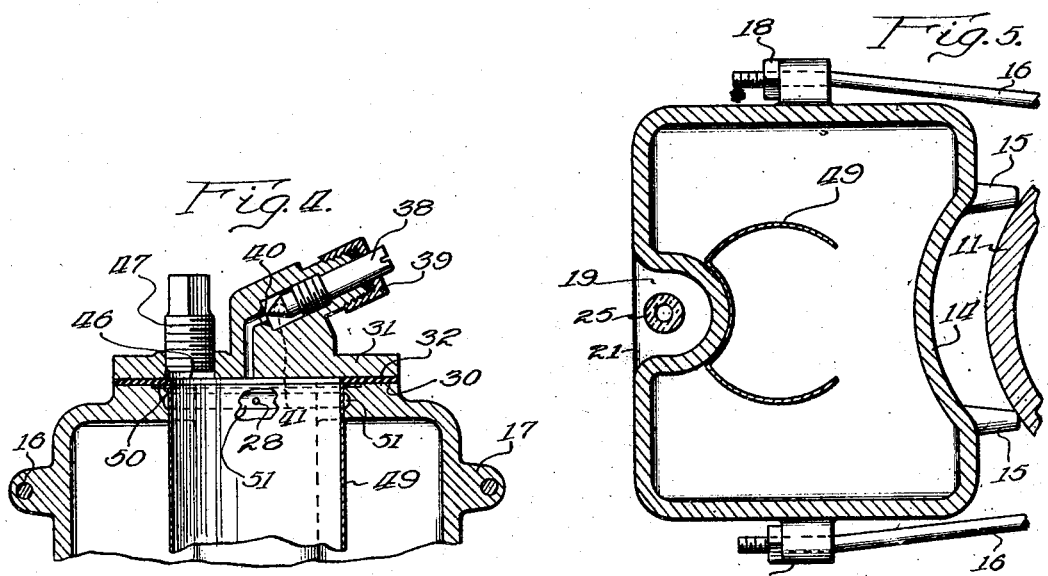

1,824,364

UNITED STATES PATENT OFFICE

CLAYTON BELKNAP PIERCE AND WILLIAM CORMAC PIERCE, OF CHICAGO, ILLINOIS

LUBRICATING APPARATUS

Application filed July 9, 1928. Serial No. 291,226.

This invention relates to lubricating apparatus for internal combustion engines, and the main objects of this invention are to provide a direct supply of lubricant to the moving parts of an engine which are exposed to the heat of combustion and normally are not properly served by the lubricant in the crank case, and to provide improved means for effectively injecting a supply of lubricant with each charge of fuel. A further object of this invention is to provide an improved form of lubricating apparatus having visual means for indicating a shortage of lubricant when the engine is not in operation and for indicating any improper performance when the engine is running.

These objects are accomplished in the device shown in the drawings by employing the vacuum in the manifold of an engine to draw air through a quantity of lubricant and to inject the vapor absorbed and mixed with the air into the combustion chamber together with the fuel.

In the accompanying drawings, we have illustrated a specific embodiment of our invention designed for use on automotive engines.

Figure 1 is a front elevation of our invention showing the same mounted on the manifold and riser of a well known make of motor.

Fig. 2 is a side elevation of the same.

Fig. 3 is a central section taken on the line 3—3 of Fig. 1.

Fig. 4 is a fragmentary section taken on the line 4—4 of Fig. 3;

Fig. 5 is a horizontal section taken on the line 5—5 of Fig. 3, and

Fig. 6 is a detail of a check valve.

In the form shown an oil reservoir or casing 10 preferably made of metal such as an aluminum alloy is mounted on the exhaust heating jacket of a riser 11 which is attached at its upper end to a manifold 12 and at its lower end to a carbureter 13 of an internal combustion engine. The casing 10 is formed with an inwardly concaved rear wall 14 which is held in spaced relation to the surface of the riser 11 by lugs or projections 15 integral with the casing. The projections 15 are suitably positioned for holding the concaved side 14 of the casing at a desired distance from the surface of the riser to prevent the lubricant in the reservoir from being overheated and are proportioned to conduct a desired amount of heat for vaporizing the oil under normal conditions. The reservoir 10 is firmly clamped on the riser by U-shaped straps 16 threaded at their ends, extended through apertures in brackets 17 integral with the casing walls and having nuts 18 thereon.

As illustrated in Figs. 3 and 5, the outer wall is curved inwardly at its middle portion forming a semi-cylindrical recess 19 having a top end closure 20 immediately below the upper extremity of the casing 10 and a bottom wall 21 spaced slightly above the bottom 22 of the casing. Vertically extending cylindrical apertures 23 and 24 are formed in the upper and lower walls 20 and 21 respectively of the recess 19. A transparent tube 25, preferably glass, is mounted at its extremities in the apertures 23 and 24, and the passage of the tube communicates with an opening 26 in the bottom wall 21 of the recess 19. A horizontal inlet passage 27 connects the aperture 23 with the atmosphere. The passage 27 extends inwardly beyond the aperture 23 and has a constricted by-pass 28 at its inner extremity which opens into a recess 51, communicative with the interior of the reservoir.

A check valve is provided to prevent escapement of air through the inlet opening when a back pressure greater than atmospheric pressure exists in the casing. The valve comprises a nipple 53, threaded in a boss 54 on the side of the casing 10. A valve seat 55 is provided in the nipple for receiving the cone shaped extremity of the valve stem 56. The intermediate portion of the valve stem 56 is of rectangular cross-section and its inner extremity is concaved forming projections 57, which engage the wall 10 of the casing and prevent the inner extremity of the stem from closing the opening 27.

When the pressure in the casing is less than that of the atmosphere it assumes the inner position shown in Figs. 3 and 6, there being an unobstructed passage for air between the cylindrical wall of the nipple and the sides of the valve stem. When a back pressure exists the valve stem 56 is moved outwardy and its cone-shaped extremity is engaged against the seat 55, closing the passage in the nipple and preventing leakage of air from the casing.

The upper end 29 of the reservoir is provided with an opening 29' which is surrounded by a machined seat or surface 30. As illustrated in Figs. 3 and 4, a cover 31 is mounted on the seat 30, there being a gasket 32, preferably comprising cork, between the seat 30 and the cover 31 for providing a leak proof joint when the cover is tightly clamped on the reservoir by screws 33. Washer gaskets 35 and 36 are positioned in the apertures 23 and 24 adjacent the top and bottom extremities respectively of the tube 25 and these washers are compressed against the ends of the tube by a helical spring 34 in the top aperture 23. When the cover 31 is clamped on the upper end of the reservoir it compresses the spring 34 forming oil and air tight joints at the extremities of the tube 25.

The cover 31 is provided with an outlet passage 37 through which air and oil vapor may flow under regulation of the valve 38. This valve is threaded in a block 39 integral with the cover 31 and may be positioned relative to the valve seat 40 for regulating the flow of vapor from the reservoir. The vapor passes upwardly through the outlet passage 37 and into a communicating discharge passage 41 in the block 39. A tube 42 is attached to the block 39 by a screw plug 43 in the discharge passage 41. As shown in Fig. 2, the other end of the copper tube 42 is connected with the manifold 12 at the aperture therein which normally receives the vacuum tank exhausting tube 44. A special coupling comprising an elbow 45 is employed for attaching both the vacuum tank exhausting tube 44 and the tube 42 to the manifold at the one aperture.

The reservoir 10 may be partially filled with oil through the filling opening 46 which is normally closed by a threaded plug 47. When the engine is in operation air is sucked up from the space above the oil level in the reservoir and discharged into the manifold 12. This action causes a partial vacuum to be created above the level of the oil which is reduced to a desired extent by incoming air from the by-pass aperture 28. When the level of the oil in the reservoir rises, the level of that in the gauge tube 25 is lowered sufficiently to permit air to flow into the reservoir at the bottom thereof. This incoming air bubbles upwardly through the oil absorbing a charge of vapor which is facilitated by the heat conducted thereto from the manifold 12. The air is guided upwardly through the oil to the outlet opening 37 by a curved baffle 49 attached to the upper end of the reservoir 10 by a flange 50 positioned between the seat 30 and the gasket 32. The air from the by-pass 28 flows into the annular recess 51 and passes around the baffle 49 into the open side thereof to the space below the discharge opening 37 where it mixes with the oil vapor. The partial vacuum above the oil level in the reservoir when the engine is in operation aids the vaporization of the oil. The agitation of the oil by the movements of the vehicle is another factor which contributes to rapid vaporization. The jet of air admitted by the constricted aperture 28 dilutes the mixture of air and oil vapor sufficiently to facilitate an even distribution of the oil vapor to the combustion chamber of the engine together with the fuel.

This method of lubrication applies oil directly to the vital parts of the top portion of the motor which ordinarily are not properly lubricated by the oil from the crank case. As the flow of the oil vapor is proportional to the suction in the manifold, there is an increased supply of vapor to the top of the motor at slow speed operation which compensates for the shortage normally existing when the crank shaft and connecting rods are rotating too slowly to throw oil from the crank case to the cylinder walls.

When the engine is not in operation the oil in the reservoir 10 and that in the tube 25 seek an equal level thus disclosing the quantity of oil in the reservoir, but when the engine is running the oil is removed from the gauge tube indicating that the lubricating apparatus is functioning properly.

Although but one specific embodiment of this invention has been herein shown and described, it is to be understood that numerous details of the construction shown may be altered or omitted without departing from the spirit of this invention as defined by the following claims.

We claim:

1. In lubricating apparatus for internal combustion engines, an oil reservoir comprising a casing having an air inlet aperture therein, spacing lugs on said casing for mounting the same in spaced relation to a heat radiating surface for heating the oil therein, an end closure on said casing comprising an outlet opening, valve mechanism for regulating the size of said opening, a conduit communicating with said outlet opening at one end and with the intake manifold of said engine at its other end for delivering a current of air and oil vapor from said reservoir to the top of said engine in quantities proportional to the vacuum in said manifold, and a gauge comprising a transparent hollow member communicating with said inlet aperture for by-passing a current of air through the oil chamber of said reservoir when said engine is operated and for indicating the quantity of oil in said reservoir when the engine is not in use.

2. In an internal combustion engine comprising a manifold and a riser communicative therewith, a casing adapted to contain lubricant comprising a concaved wall positioned adjacent said riser, pins on said concaved wall for holding the casing in spaced relation to said riser, and means associated with said casing for circulating air through said lubricant comprising a conduit communicative with said manifold for injecting lubricant vapor into the top of said engine.

3. In an internal combustion engine comprising a manifold and a riser communicative therewith, a casing adapted to contain lubricant comprising a concaved wall positioned adjacent said riser, pins on said concaved wall for holding the casing in spaced relation to said riser, means associated with said casing for circulating air through said lubricant comprising a conduit communicative with said manifold for injecting lubricant vapor into the top of said engine, spaced bosses on said casing, and means attached to said bosses and extended around said riser firmly securing said casing thereto.

4. Lubricating apparatus for an internal combustion engine comprising an oil reservoir having air inlet and outlet apertures therein, a transparent tube communicating at one end with said air inlet and the reservoir and at the other end with the bottom of said oil reservoir for injecting air below the oil level thereof, said tube being adapted to disclose the flow of air to the bottom of said reservoir when said engine is in operation and to indicate the quantity of oil in said reservoir when said engine is not in operation.

Signed at Chicago this 3rd day of July, 1928.

CLAYTON BELKNAP PIERCE.
WILLIAM CORMAC PIERCE.